Patented Dec. 16, 1952

2,622,029

UNITED STATES PATENT OFFICE 2,622,029

METHOD OF TREATING ORGANIC NON-CALCAREOUS ANIMAL PRODUCTS

David Torr, New York, N. Y., assignor to
Charles J. Ely, Oakland, N. J.

No Drawing. Application March 10, 1951,
Serial No. 215,017

5 Claims. (Cl. 99—107)

This invention relates to the treating of animal products, including packing house animal by-products, and the production of improved food products therefrom. It includes an improved method of treating such animal products and by-products, the improved food products so produced and compositions and packaged products containing the same.

In my copending application, Serial No. 159,857, filed May 3, 1950, I have described and claimed a method for producing improved food products from animal bones whereby the entire bone material is first subjected to crushing and to grinding and is then subjected to further and repeated disintegration with progressive reduction in size of the bone particles and hydrolysis of organic material until the entire mass is in a colloidal state containing both organic and inorganic components of the bone. As distinguished therefrom, the present invention is directed more particularly to the treating of the essentially organic, i. e., noncalcareous, portions of the animal.

The animal products and packing house by-products treated in accordance with my present invention include all edible animal products and by-products of an organic, noncalcareous nature, as distinguished from bones and the like which consist largely of inorganic matter. The invention also contemplates the treatment of organic, noncalcareous, packing house animal by-products generally classified as inedible but which may be converted to edible materials by the process of my present invention.

More particularly, the term edible and inedible organic packing house by-products, as used herein, and in the appended claims, will be understood not to include bones, hair, wool, or the like, but to include all of the fleshy or meaty portion of the animal, for instance, ears, lips, snouts, the meaty portion of the head, knuckles, feet, and tails, tendons, brain, muscular tissues, sinews, fats, glands, skin tissues, cheeks, tongue, cartilage, horn piths, pizzles, stomach, lungs, intestines, and viscera generally.

The invention is equally applicable to other fleshy portions of the animal not usually classified as by-products. However, such portions may generally be otherwise utilized to greater economic advantage.

The treatment of animal hides by the process of the present invention is more specifically described and claimed in Serial No. 202,581, filed December 23, 1950.

In accordance with my present invention, any one, or a mixture of two or more of the edible or inedible organic packing house by-products, or other essentially organic portions of the animal, is subjected to physical disintegration, as by cutting and grinding, with progressive reduction in particle size and hydrolysis of protein constituents until the entire mass is in a colloidal state. Prior to the physical disintegration, the material may, if desired, be cooked, but it is generally advantageous to effect the disintegration and hydrolysis of the organic material in the raw state.

The initial stages of the physical disintegration may be effected in any conventional manner, as by cutting or grinding, into relatively small pieces, say such as will pass through a 100 mesh sieve. The completion of the disintegration and the hydrolysis is effected in a colloid mill, advantageously in successive stages, e. g., three or more successive stages, with progressively closer setting of the colloid mill until finally the product is reduced to colloidal fineness, generally below 10 microns and advantageously below 5 microns, and with a range of e. g., 1 to 10 microns, or less. A colloid mill with a shaft and with rotor and stator adjustable as to clearance, is advantageously used with a speed of rotation of about 6,000 to 15,000 R. P. M. and advantages with surfaces of the rotor and stator of a material, such as Carborundum, synthetic sapphire or diamond, which will exert the necessary grinding and shearing to reduce the particles to the ultimate state of fineness above indicated.

In disintegrating and hydrolyzing in such a colloid mill, where the final setting is almost zero clearance, a considerable amount of heat is generated and cooling may be necessary to avoid overheating of the material during grinding. By sufficient cooling of the mill, the final product, if made from uncooked material, can be recovered in an uncooked state. By proper regulation of the temperature during disintegration and hydrolysis, the product may be sterilized or cooked to a greater or lesser extent by the heat generated in the disintegrating, or shearing operation in the closely set colloid mill. The operation is advantageously carried out in an inert atmosphere, such as nitrogen or carbon dioxide, or with other protection of the material from the air to avoid oxidation, for instance, by flooding the chamber with live steam. Depending on the final product desired, the temperature of the material fed to the mill may range up to near the boiling point. In any event, hydrolysis of the protein materials will be effected by conditions prevailing at the grinding surfaces.

The heating of the material during disintegration and hydrolysis may tend to remove more or less water therefrom and dry out the product. To avoid this, or to give a product of increased moisture content, water may be admixed with the product before or during the final disintegration and hydrolysis to increase the moisture content of the product, and to give a final product of a gelatinous nature and of regulated and predetermined moisture content. Where the moisture content is around 15 to 30%, the feed to the mill is advantageously a forced feed. With a higher moisture content of the material, e. g., between 50 and 60%, or up to 100%, or even up to 200% or 300% or 500%, or higher, a gravity feed may be sufficient.

The successive disintegrating and hydrolyzing operation results not only in progressive comminution of the organic material into finer and finer particle sizes, but also results in a most intimate and homogeneous intermixture of the constituents with a breaking-up of connective tissues, cartilage, blood vessels, marrow, and other organic matter present and hydrolysis of protein and other constituents into an ultimate state of subdivision and hydrolysis which makes the composite material colloidal in character. The protein and nucleoprotein and cartilage are not only thoroughly broken-up and disintegrated into a colloidal state but are hydrolyzed and intimately and thoroughly blended with each other in a colloidal matrix.

Further, any fat present in the mixture is so thoroughly and uniformly dispersed in the resultant product that subsequent separation does not occur under conditions usually encountered. Accordingly, even where relatively large proportions of fat are used along with the other materials, a homogenized product is obtained from which the fat does not separate in globules, or layers, even upon long standing. This characteristic of the product is particularly advantageous when the product is to be canned, or used as a component of canned goods.

A further advantage of my present invention is that, though ossein or collagen, present in the material treated, is hydrolyzed, the fats are not so hydrolyzed by my process but are colloidally dispersed and remain as such and the resultant homogeneous gelatinous material, so thoroughly dispersed in the proteins or hydrolyzed proteins and other organic constituents that the fat loses its identity with the result that even though relatively large proportions of fat are present, a palatable, intimately blended gelatinous product may be produced.

The product of the disintegrating and hydrolyzing operation is a colloidal product somewhat comparable with butter and jelly in feel and consistency but it may contain a greater or lesser amount of water and may vary in consistency from a thin jelly, where water is added, to a thick butter-like, or stiff jelly product, where the water constituent is low or where the product is partially dried during disintegration and hydrolysis.

By further drying, advantageously in a vacuum, or at a low temperature, a dry, solid product is obtained which can be ground up into powder form. In general, however, the colloidal product, in more or less thick jelly or gelatinous form, can advantageously be used as a food product, or for blending with other food products, for human consumption or as an adjunct for animal or poultry feeding.

New colloidal product may be produced in accordance with my present invention, containing a combination of highly valuable, nutritional ingredients. The disintegration and hydrolysis not only breaks up the physical structure of the organic matter and converts it into a uniform, homogeneous colloidal gelatinous mass, but breaks down or hydrolyzes, to a greater or lesser extent, proteins and other materials, such as ossein or collagen, into gelatin and makes available the valuable gelatin content or component of the organic materials in a valuable nutritional form. Thus, the approximate amino acid composition of gelatin protein is as follows:

| | Per cent |
|---|---|
| Alanine | 11.2 |
| Arginine | 8.5 |
| Aspartic acid | 9.6 |
| Cystine | 0.1 |
| Glutamic acid | 6.1 |
| Glycine | 26.5 |
| Histidine | 1.1 |
| Hydroxyproline | 14.6 |
| Isoleucine | 1.9 |
| Leucine | 4.1 |
| Lysine | 4.8 |
| Methionine | 0.9 |
| Phenylalanine | 2.2 |
| Proline | 17.2 |
| Serine | 3.7 |
| Threonine | 1.7 |
| Tryptophan | 0.0 |
| Valine | 2.8 |

The new colloidal product of the present invention contains as a major or important constituent, the gelatin resulting from the partial or complete hydrolysis of the ossein or collagen present in the material treated in a readily available form, thus making the new colloidal product a valuable food adjunct because of its content of such hydrolyzed products. Proteins, other than collagen or ossein, present in the material treated are similarly disintegrated and hydrolyzed and converted into a readily available form of protein. As previously noted, the fat content of the material treated is also disintegrated into an exceedingly fine and available form.

In physical consistency, the colloidal product may be, as above indicated, produced in a dry state and in powder form. It is advantageously produced in the form of a colloidal jelly-like mass, or gelatinous mass, which may vary in consistency from a thin jelly, particularly where a considerable amount of water is added prior to, or during, the final disintegration and hydrolysis. Even with a considerable amount of water present, the colloidal product is nevertheless a jelly-like, or gelatinous product, due in part to the gelatin set free by hydrolysis during the process. The intimate colloidal intermixing of all of the organic materials is also in part responsible for the gelatinous, or jelly-like character of the product which, in highly concentrated state, with a small amount of water, resembles a thick jelly, or a more or less stiff gelatinous mass with considerable body.

The new colloidal product is a valuable supplement for use with other foods. It is a palatable product and can be admixed with salt, or may have salt added to it, and utilized directly as a food product or adjunct. It can advantageously be mixed with other foods to form a composite food product. It is thus a valuable concentrated product for use in making soups, for soup stock, and for admixture with other ingredients for soup manufacture.

The new colloidal product is a particularly valuable product for use with other meat products. It can thus be advantageously added to and admixed with the other materials commonly used in making frankfurters, bologna or deviled or potted meats or meat spreads, luncheon meats, etc. It may thus be admixed with such products to the extent of 5 to 35% or more. The colloidal and gelatinous or jelly-like character of the product is of value in giving a firmer consistency to many of the meat products with which it is admixed.

The new colloidal product is also advantageously admixed with meat such as is used for meat loaf or canned ground meat products such as canned hamburgers, canned stews, etc., in amounts, e. g., of 10 to 35%.

Another advantageous application of the invention is in canned meat, where meat is cut up into pieces and placed in cans. The colloidal product of the present invention is advantageously used with such meat pieces to fill the interstices, or to form a matrix containing pieces of meat distributed therein, giving a can of meat filled with meat pieces or chunks surrounded by the colloidal matrix. The uncooked meat, admixed with the uncooked colloidal material, can be placed in the can and sterilized or cooked in the can; or both the meat and the colloidal material can be precooked separately or in admixture before canning.

The new colloidal product is a valuable product not only as an adjunct, or food product, for human consumption, but is also advantageous for use in animal food or poultry food. The colloidal product can thus be admixed with other constituents of chicken food, or with animal feed, or can be separately supplied as a supplemental food product.

Where an increase in fat content is desired in the product, fat may be separately added to the other materials and disintegrated therewith to give a colloidal product which contains the added fat material uniformly dispersed therein. Fat pieces which themselves are unpalatable, are thus blended in the colloidal product in a palatable form and any deficiency in fat content of the colloidal product, or in the composite product with which it is to be used, for example, with lean meat, can thus be supplied in an advantageous manner. The amount of fat so added may be varied, for example, from a few per cent to one-quarter or one-half of the protein content.

The invention is applicable not only to the usual food animals, such as cattle, hogs, sheep and goats, but also to horses, rabbits and any other animals suitable for food for human consumption, or for animal or poultry feeding.

Further, while the invention is especially applicable to the production of foods, it will be understood that any of these edible or inedible animal products or by-products processed by the method herein described, may be used in part, or in their entirety as a constituent of fertilizer, or the like.

I claim:

1. The method of treating organic, noncalcareous, animal products and by-products which comprises progressively disintegrating such material until it has been entirely converted into a colloidal, gelatinous mass of particle size less than ten microns and hydrolyzing collagen, present in the material being treated, to gelatin during disintegration.

2. The process of claim 1 in which the material treated is an edible packing house by-product.

3. The process of claim 1 in which the material treated is an inedible packing house by-product.

4. The process of claim 1 in which the material treated is a mixture of edible and inedible packing house by-products.

5. The process of claim 1 in which animal fat is added to the material treated prior to the final disintegration.

DAVID TORR.

REFERENCES CITED

The following references are of record in the file of this patent:

UNITED STATES PATENTS

| Number | Name | Date |
|---|---|---|
| 1,057,215 | Bohrmann | Nov. 25, 1913 |

OTHER REFERENCES

"Consolidated Grain Milling Catalogs," 1937, 4th Edition, pages 406 and 407.

"Provender Milling," 1945 by Lockwood, published by Northern Publishing Company Ltd., New York, page 35.